(12) United States Patent
Kawasaki

(10) Patent No.: US 6,435,618 B1
(45) Date of Patent: Aug. 20, 2002

(54) SEAT

(75) Inventor: Seiji Kawasaki, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/573,931

(22) Filed: May 18, 2000

(30) Foreign Application Priority Data

May 18, 1999 (JP) ............................................. 11-137765

(51) Int. Cl.[7] ................................................. A47C 7/02
(52) U.S. Cl. ................................................. 297/452.56
(58) Field of Search ....................... 297/452.64, 452.56, 297/452.55, 452.13

(56) References Cited

U.S. PATENT DOCUMENTS

| | | | | |
|---|---|---|---|---|
| 4,702,522 A | * | 10/1987 | Vail et al. ............... | 297/452.56 |
| 4,869,554 A | * | 9/1989 | Abu-Isa et al. ......... | 297/452.56 |
| 4,883,320 A | * | 11/1989 | Izumida et al. ......... | 297/452.56 |
| 4,910,817 A | * | 3/1990 | Kita ....................... | 297/452.56 |
| 5,378,040 A | * | 1/1995 | Chaney et al. ......... | 297/452.56 |
| 5,632,526 A | * | 5/1997 | McLarty ................ | 297/452.56 |
| 5,762,403 A | * | 6/1998 | Robinson ............... | 297/452.13 |
| 6,102,482 A | * | 8/2000 | Dettoni et al. ......... | 297/452.56 |
| 6,152,534 A | * | 11/2000 | Maeda et al. .......... | 297/452.56 |
| 6,231,125 B1 | * | 5/2001 | Maeda et al. .......... | 297/452.56 |

* cited by examiner

Primary Examiner—Jerry Redman
(74) Attorney, Agent, or Firm—Steinberg & Raskin, P.C.

(57) ABSTRACT

A seat capable of exhibiting improved seating characteristics. A backing cloth member of a one-piece structure is stretchedly arranged form a seat back section of a seat frame to a seat cushion section thereof. A net-skin member of a one-piece structure is laminated on a front surface of the backing cloth member so as to extend from the seat back section to the seat cushion section. The net-skin member includes a front mesh layer, a rear mesh member and a number of piles arranged between the front mesh layer and the rear mesh layer to connect the front and rear mesh layers to each other therethrough. Such constriction permits a central region of the net-skin member which exhibits maximum cushion characteristics to be arranged at a position corresponding to the hip to waist of a person on the seat, to thereby eliminate a hard feeling of the frame member positioned at an interface between the seat back section and seat cushion section, resulting in seating characteristics of the seat being highly improved.

3 Claims, 8 Drawing Sheets

SEAT

BACKGROUND OF THE INVENTION

This invention relates to a seat, and more particularly to a seat including a net-like skin member.

A seat required to exhibit satisfactory cushioning characteristics such as, for example, a seat for an automobile or the like is generally manufactured by arranging a spring member such as a coiled spring, an S-shaped spring or the like on a seat frame, arranging a pad member made of urethane or the like on the spring member and covering the pad member with a cover member made of a synthetic or vinyl leather, a fabric or the like. However, the conventional seat thus manufactured is increased in thickness including a thickness of the spring member, as well as weight. Also, the seat is deteriorated in breathability or air permeability unless it employs any specific means such as formation of vent holes or air permeation holes through the pad member. Further, employment of such means causes an increase in manufacturing cost of the seat.

In order to solve the foregoing problem, a seat was proposed which is so constructed that a front mesh layer and a rear mesh layer are connected to each other through a number of piles arranged therebetween, to thereby provide a net-like skin member of a truss structure. The truss structure permits the seat to exhibit elasticity sufficient to minimize setting thereof, so that it may be increased in properties of dispersing and absorbing a body pressure of a person on the seat. Thus, the seat exhibits significantly increased cushioning properties even when it is reduced in thickness. Further, the seat is constructed into the net structure as described above, resulting in being improved in air permeability without employing any specific means.

The net-like skin member which has such advantages as described above is stretchedly arranged on a seat back section of a seat frame and a seat cushion section thereof in such a manner that the net-like skin member on the seat back section and that on the seat cushion section are independent from each other. Such arrangement of the net-like skin member causes a hard feeling of the frame member to be significantly transmitted to the body of a person on the seat at a boundary between portions of the seat back section and seat cushion section against which the lumbar is abutted, as compared with central portions of the seat back section and seat cushion section against which the remaining part of the human body is abutted.

SUMMARY OF THE INVENTION

The present invention has been made in view of the foregoing disadvantage of the prior art.

Accordingly, it is an object of the present invention to provide a seat having a net-like skin member incorporated therein which is capable of eliminating a hard strike feeling of a frame member on the body of a person on the seat at a boundary between a seat back section of a frame member and a seat cushion section thereof, to thereby exhibit satisfactory seating characteristics.

In accordance with the present invention, a seat is provided. The seat includes a seat frame including a seat back section and a seat cushion section, a backing cloth member constructed into a one-piece structure and stretchedly arranged from the seat back section to the seat cushion section, and a net-like skin member constructed into a one-piece structure. The net-like skin member includes a front mesh layer, a rear mesh member and a number of piles arranged between the front mesh layer and the rear mesh layer to connect the front and rear mesh layers to each other therethrough and layered on a front surface of the backing cloth member so as to extend from the seat back section to the seat cushion section.

In a preferred embodiment of the present invention, the backing cloth member is so constructed that a height thereof positionally corresponding to a central region of the seat back section defined in a width direction thereof is set so as to positionally correspond to the thoracic vertebrae of a person on the seat.

In a preferred embodiment of the present invention, the backing cloth member is formed at a portion thereof positionally corresponding to the seat back section with a slit so as to extend in a width direction thereof.

In a preferred embodiment of the present invention, the piles are formed by knitting a single thread between the front mesh layer and the rear mesh layer.

BRIEF SUMMARY OF THE INVENTION

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Figure 1:
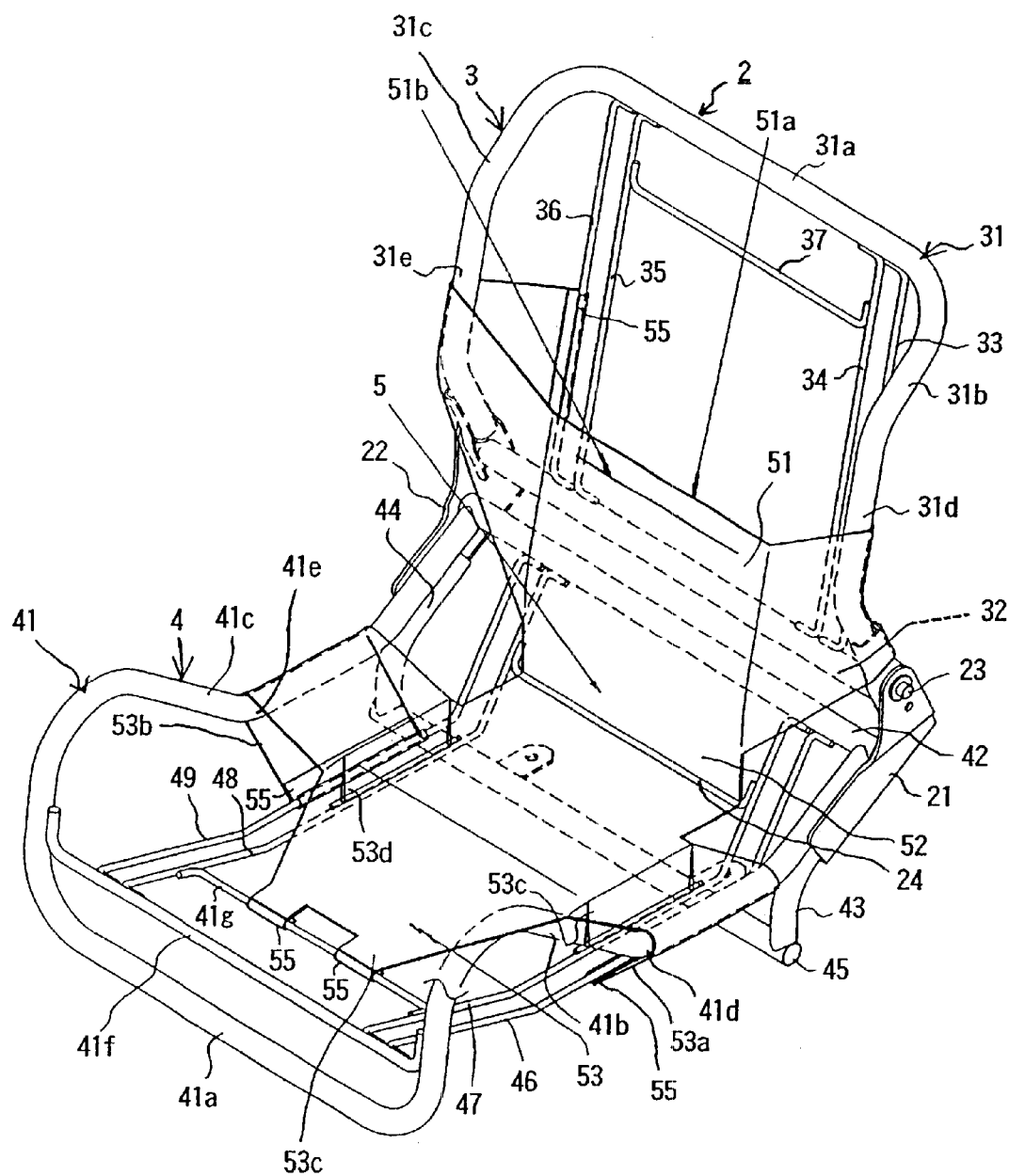
FIG. 1 is a perspective view showing a seat frame and a backing cloth member incorporated in an embodiment of a seat according to the present invention.

Now, a seat according to the present invention will be described hereinafter with reference to the accompanying drawings.

Referring first to FIGS. 1 to 10, an embodiment of a seat according to the present invention is illustrated. A seat of the illustrated embodiment generally designated at reference numeral 1 generally includes a seat frame 2, a backing cloth member 5 and a net-like skin member 6.

Figure 2:
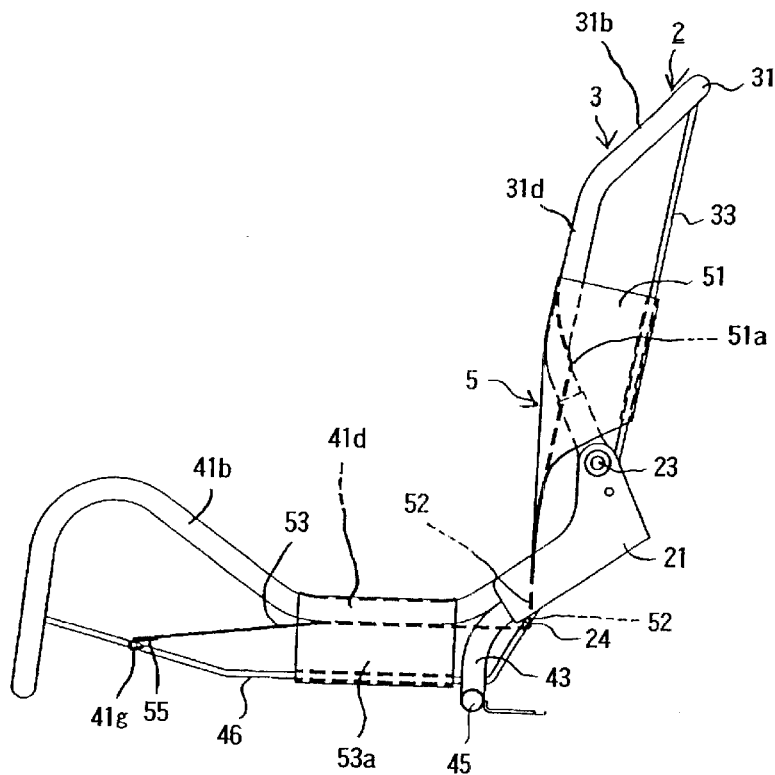
FIG. 2 is a side elevation view of the seat frame and backing material shown in FIG. 1.
Figure 3:
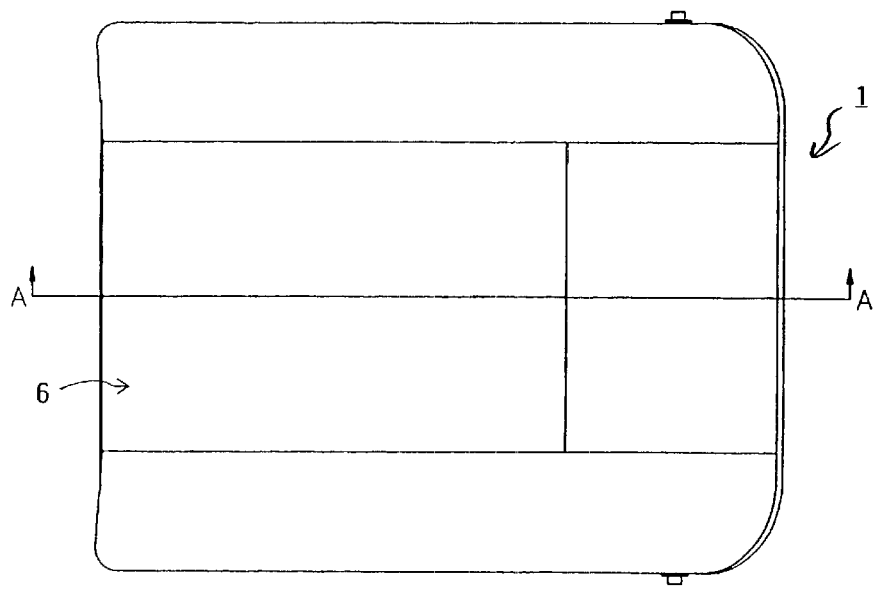
FIG. 3 is a plan view showing an appearance of the seat of FIG. 1.
Figure 4:
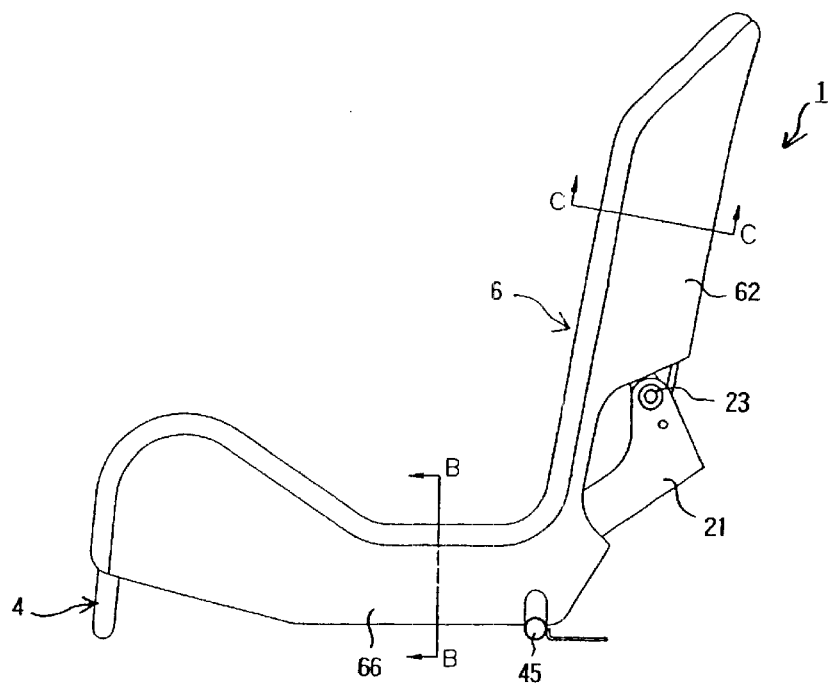
FIG. 4 is a side elevation view showing an appearance of the seat of FIG. 1.

The seat frame 2, as shown in FIGS. 1 and 2, includes a seat back section 3 and a seat cushion section 4. The seat back section 3 includes a first frame member 31 formed into a substantially inverted U-shape in front. More specifically, the first frame member 31 is constituted of a top or lower frame portion 31a and a pair of side frame portions 31b and 31c downwardly extending from both ends of the top frame portion 31a. The seat back section 3 also includes a connection frame member 32 arranged so as to extend between free ends or lower ends of the side frame portions 31b and 31c, to thereby connect both side frame portions 31b and 31c to each other therethrough. The side frame portions 31b and 31c are bent at central regions thereof so as to forwardly project or expand, to thereby provide central projections 31d and 31e, respectively.

The seat cushion section 4 includes a second frame member 41 formed into a substantially U-shape in plan. More particularly, the second frame member 41 is constituted of a bottom or lower frame portion 41a and a pair of side frame portions 41b and 41c upwardly extending from both ends of the bottom frame portion 41a. The seat cushion section 4 also includes a connection frame member 42 arranged so as to extend between free ends or upper ends of the side frame portions 41b and 41c, to thereby connect both side frame portions 41b and 41c to each other therethrough. The side frame portions 41b and 41c are bent at central regions thereof so as to downwardly project or expand, to thereby provide central projections 41d and 41e, respectively. Also, the side frame portions 41b and 41c each are downwardly bent at a part thereof in proximity to the bottom frame portion 41a, to thereby provide a downward bent part so that the bottom frame portion 41a may be contacted with a mount surface or a surface of a mount on which the seat is installed or set.

Further, in order to ensure that the central projections 41d and 41e of the side frame portions 41b and 41c are kept upwardly spaced from the mount surface when the bottom frame portion 41a is contacted with the mount for setting, the side frame portions 41b and 41c are mounted on a rear side of a part thereof in proximity to the free ends thereof with support frames 43 and 44 bent into a substantially doglegged shape in a back-to-back manner by welding, respectively. The seat cushion section 4 also includes a installation frame member 45 mounted on lower ends of the support frame members 43 and 44 so as to extend therebetween. The installation frame member 45 and bottom frame portion 41a are contactedly arranged on the mount surface while keeping the central projections 41d and 41e of the side frame portions 41b and 41c spaced from the mount surface.

Arranged between the free ends of the side frame portions 31b and 31c of the first frame member 31 constituting the seat back section 3 and the free ends of the side frame portions 41b and 41c of the second frame member 41 constituting the seat cushion section 4 are connection brackets 21 and 22 which are formed into a substantially L-shape. The connection brackets 21 and 22 are arranged in a manner to extend between the free ends of the side frame portions 31b and 31c and those of the side frame portions 41b and 41c. The brackets 21 and 22 have pivot pins 23 and 24 inserted therethrough, which are then inserted through the side frame portions 31b and 31c of the first side frame member 31, respectively, so that the first frame member 31 may be pivotally moved about the pivot pins 23 and 24 in forward and rearward directions of the seat. The side frame portions 41b and 41c of the second frame member 41 are fixed on the brackets 21 and 22 by welding.

Further, the seat back section 3 includes four auxiliary frame members 33 to 36 arranged between the top frame portion 31a of the first frame member 31 and the connection frame 32 so as to straightly extend therebetween and fixed thereto by welding. The auxiliary frame members 33 and 34 are arranged in proximity to the side frame portion 31b and the remaining ones 35 and 36 are arranged near the side frame portion 31c. Such arrangement of the auxiliary frame members 33 to 36 permits them to be positioned behind the central projections 31d and 31e forwardly projecting.

The seat cushion section 4 also includes a front auxiliary frame member 41f arranged so as to extend between the above-described downwardly bent parts of the side frame portions 41b and 41c of the second frame member 41 positioned in proximity to the bottom frame portion 41a. Between the front auxiliary frame member 41f and the connection frame member 42 of the seat cushion section 4 are arranged four auxiliary frame members 46 to 49 by welding in such a manner that two such frame members 46 and 47 are positioned in proximity to the side frame portion 41b and the remaining two frame members 48 and 49 are positioned near the side frame portion 41c. The auxiliary frame members 46 to 49 each are bent so as to be positioned below the side frame portions 41b and 41c.

Also, the auxiliary frame members described above are so arranged that the backing cloth member 5 is held on the auxiliary frame members 33, 36, 46 and 49 arranged on the outside and the net-like skin member 6 is held on the auxiliary frame members 34, 35, 47 and 48 arranged on the inside, as described hereinafter.

Also, the backing cloth member 5 is supported at an intermediate section 52 thereof defined in a longitudinal direction thereof on an intermediate auxiliary frame member 24. The intermediate auxiliary frame member 24 is arranged between the inside auxiliary frame members 47 and 48 positioned in proximity to the connection frame member 42 of the seat cushion section 4. Also, the intermediate auxiliary frame member 24 is positioned rearwardly of the central projections 31d and 31e of the side frame portions 31b and 31c of the seat back section 3 as viewed from the side.

The backing cloth member 5 is formed into a size sufficient to be stretched from the seat back section 3 of the seat frame 2 to the seat cushion section 4. However, the backing cloth member 5 is not necessarily required to cover the overall seat back section 3 and seat cushion section 4. It may be merely required to cover an area of the seat back section 3 and seat cushion section 4 to which a support pressure of a large magnitude is applied, when a person is on the seat. In particular, the backing cloth member 5 on the seat back section 3 is preferably cut so that a central portion 51a of the backing cloth member 5 defined in a width direction thereof has a height corresponding to a position of the thoracic vertebrae of a person on the seat.

The backing cloth material 5 includes a seat back stretched section 51 which is stretchedly arranged on the seat back section 3 of the seat frame 2, the above-described intermediate section 52 and a seat cushion stretched section 53 which is stretchedly arranged on the seat cushion section 4 of the seat frame. The seat back stretched section 51 has a width formed to be larger than a width of the first frame member 31 or a distance between the side frame portions 31b and 31c. More specifically, the seat back stretched section 51 is formed into a width sufficient to permit the section 51 to extend through a front surface of the side frame portions 31b and 31c to the auxiliary frame members 33 and 36 behind the seat back section 3. The intermediate section 52 has a width formed to be equal to or smaller than a length of the intermediate frame member 24 and is arranged so as to extend below the member 24.

The seat cushion stretched section 53 is formed at a proximal end thereof into a width substantially equal to that of the intermediate section 52 and provided at a substantially central portion thereof with projection elements 53a and 53b laterally projecting. The projection elements 53a and 53b have a width formed so as to extend beyond an upper side of the side frame portions 41b and 41c and then extend to the outside auxiliary frame members 46 and 49 after they turn down about the side frame portions 41. The seat cushion stretched section 53 is held at a front end portion 53c thereof on a holding frame member 41g arranged so as to extend rather in proximity to the front auxiliary frame member 41f between the inside auxiliary frame members 47 and 48 arranged below the seat cushion section 4. The seat cushion stretched section 53 is provided at a portion thereof near both sides thereof with hanging elements 53c and 53d adapted to be engaged with hanging wires 47a and 48a arranged in proximity to the inside auxiliary frame members 47 and 48. Such arrangement permits the seat cushion stretched section 53a to be concave.

The backing cloth member 5 is provided with a laterally extending slit or notch 51b at a portion thereof rather in proximity to an upper edge thereof near the central portion 51a of the seat back stretched section 51 so as to be positioned in correspondence to the lumbar of a person on the seat. Such arrangement of the slit 51b permits stretching of the net-like skin member 6 layered on the backing cloth member 5 to be adjusted. More particularly, formation of the slit 51b permits tensile strength concentrated at an end of the net-like skin member 6 to be dispersed around the slit 51b, resulting in a pressure applied to the end of the net-like skin member 6 being reduced. The number of slits 51b to be formed depends on a material for the net-like skin member, a thickness thereof or the like.

The backing cloth member 5 may be made of any suitable material so long as it exhibits a support pressure at a predetermined level, when a person is on the seat while keeping it stretched over the seat frame 2 under tensile strength at a predetermined level. It is preferably constituted by a woven fabric made of a thermoplastic resin material such as polyethylene terephthalate (PET), polybutylene terephthalate or the like. Also, it is preferably formed into a net-like structure in order to exhibit air permeability.

Figure 9:
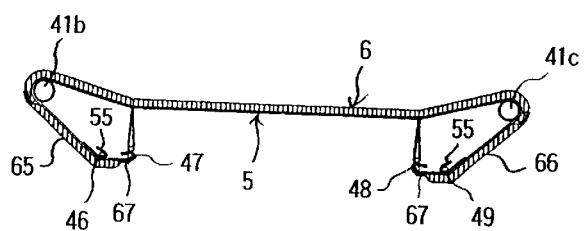
FIG. 9 is a sectional view taken along line B—B of FIG. 4.
Figure 10:
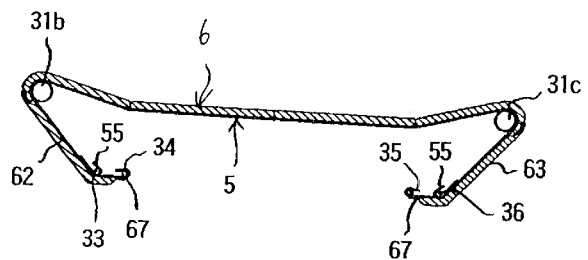
FIG. 10 is a sectional view taken along line C—C of FIG. 4.

Also, a means for holding ends or edges of the backing cloth member 5 on the auxiliary frame members 33, 36, 46 and 49 and holding frame member 41g is not subject to any restriction. In the illustrated embodiment, as shown in FIGS. 1, 9 and 10, a holding member 55 made of thermoplastic resin and formed into a substantially U-shape in section is used as the means for this purpose. Holding of the backing cloth member 5 on the holing member 55 is carried out by putting each of the ends of the backing cloth member 5 on the holding member 55 and subjecting both to oscillating welding to fix both together, followed by fitting of the holding member 55 on each of the auxiliary frame members 33, 36, 46 and 49 and holding frame member 41g through an open side thereof.

Oscillating welding utilizes frictional heat for melting of thermoplastic resin. The frictional heat may be obtained by applying a pressure between two members to be welded while applying vibration to surfaces of the members over several millimeters in a lateral direction. When application of vibration is stopped after vibration is carried out for 2 to 3 seconds, the two members automatically return to the original position without causing misregistration therebetween. Then, the members are subject to cooling for about 1 second, resulting in being securely welded together. The oscillating welding brings about advantages such as a reduction in time required for the welding, a reduction in power consumption, elimination of generation of any odor and the like. Also, it is effectively applied to articles of a complicated or irregular configuration and facilitates positional registration between articles to be welded. Further, it permits welding between articles different in material and ensures secure welding irrespective of water absorption properties of articles to be welded and hardness thereof.

Figure 11:
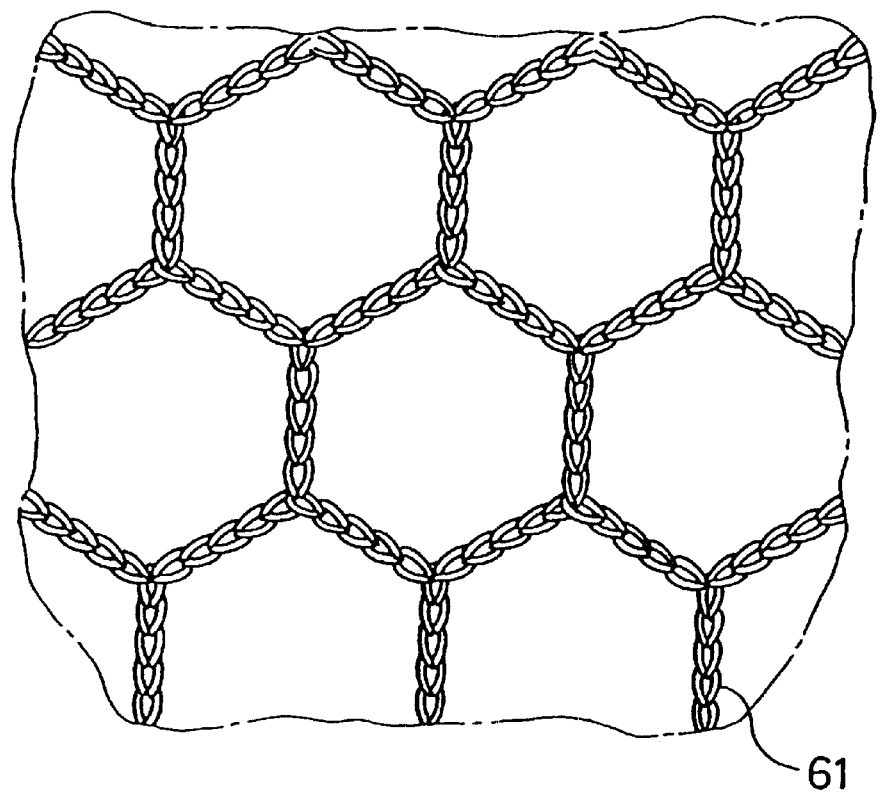
FIG. 11 is a fragmentary enlarged view showing a front mesh layer constituting a part of a net-like skin member.
Figure 12:
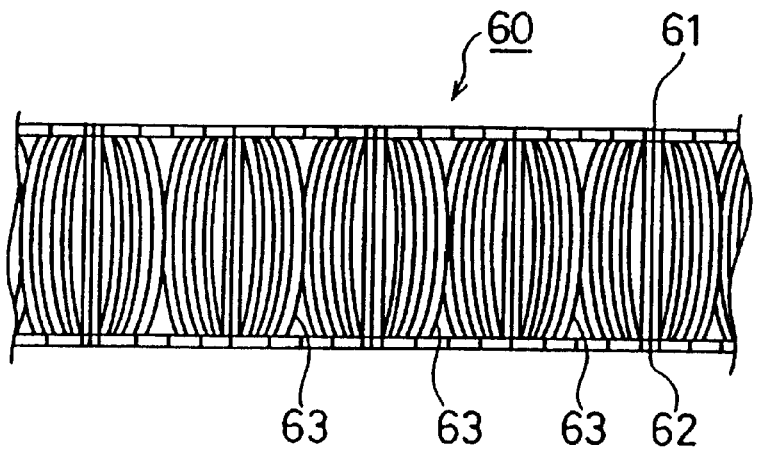
FIG. 12 is a fragmentary sectional view showing a net-like skin member.
Figure 13:
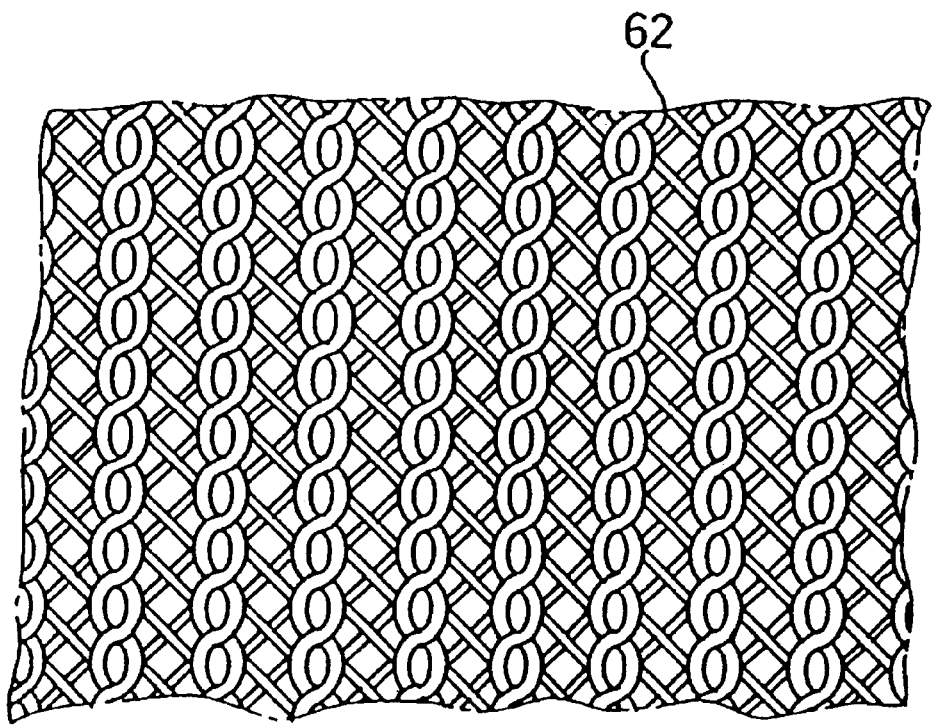
FIG. 13 is an fragmentary enlarged view showing a rear mesh layer constituting a part of a net-like skin member.

The net-like skin member 6 is made of a stereo mesh knit constructed as shown in FIGS. 11 to 13. The stereo mesh knit is constructed of a front mesh layer 61, a rear mesh layer 62 and a number of piles for coupling or connecting the front mesh layer 61 and rear mesh layer 62 to each other therethrough into a truss structure.

The front mesh layer 61, as shown in FIG. 11, is made of a twist thread formed by twisting thin yarns and formed into a honeycomb (hexagonal) mesh structure. The rear mesh layer 62, as shown in FIG. 13, is formed by twisting thin yarns into a twist thread and then subjecting the twist thread to rib stitch. The rear mesh layer 62 is formed into a mesh structure of which a mesh is smaller than the honeycomb mesh of the front mesh layer 61. The piles 63 each are made of a single thick thread and knitted between the front mesh layer 61 and the rear mesh layer 62 to space both layers from each other at a predetermined interval. This permits the stereo mesh knit to be provided with rigidity at a predetermined level. In the illustrated embodiment, the layer of the honeycomb-like mesh structure is used as the front mesh layer 61 which is adapted to be contacted with the body of a person on the seat. Alternatively, the layer may be used as the rear mesh layer 62, wherein the small-mesh layer described above is used as the rear mesh layer 62. Also, the mesh layers 61 and 62 may be formed into a mesh configuration other than the honeycomb mesh configuration and small mesh configuration, as shown in Table 1.

The stereo mesh knit for the net-like skin member 6 may be preferably made of thermoplastic resin. Preferably, the thermoplastic resin to be used for this purpose is formable into a fiber-like shape and exhibits strength required for a seat material when it is woven. Thus, for example, thermoplastic polyester resins represented by polyethylene terephthalate (PET), polybutylene terephthalate (PBT) and the like; polyamide resins represented by nylon 6, nylon 66 and the like; polyolefin resins represented by polyethylene, polypropylene and the like; and any combination thereof may be used as a material for the stereo mesh knit.

The piles 63 each have a thickness of 380 d or more and preferably 600 d or more. This permits load applied from a person on the seat to the stereo mesh knit to be borne by deformation of the meshes constituting the mesh layers 61 and 62 and falling of the piles 63, resulting in providing a flexible structure which prevents concentration of stress.

Table 1 shows materials suitable for use for the net-like skin member 6 and physical characteristics thereof by way of example.

TABLE 1

| Item | | D80036 | D80053-2 | D80053-2Ba | D80053-3 | D80053-4 | D80053-5 |
|---|---|---|---|---|---|---|---|
| *1 | | Nylon | Polyester | ← | ← | ← | ← |
| *2 | | 888 | 784 | 864 | 984 | 876 | 1128 |
| *3 | *4 | 8.0 | 7.5 | ← | 8.5 | 7.0 | 8.5 |
| | *5 | 14.0 | 13.0 | ← | ← | 14.0 | 13.0 |
| *6 | *7 | 220 d/1f | 1300 d/96f | ← | ← | ← | ← |
| | *8 | | 500 d/70f | ← | ← | ← | ← |
| | *9 | 880 d/1f | 600 d/1f | ← | ← | 800 d/1f | ← |
| *10 | *11 | 38.0 | 156.9 | 158.4 | 152.1 | 148.7 | 159.3 |
| | *12 | 24.8 | 62.1 | 79.4 | 136.5 | 57.5 | 130.1 |
| *13 | *11 | 111.1 | 56.2 | 62.5 | 48.3 | 50.1 | 50.2 |
| | *12 | 189.3 | 66.4 | 68.2 | 43.3 | 78.0 | 40.0 |
| *14 | *11 | 33.8 | 87.9 | 79.2 | 75.0 | 91.1 | 77.7 |
| | *12 | 26.2 | 49.2 | 44.9 | 63.7 | 41.1 | 66.7 |
| *15 | *11 | — | 2.6 | ← | 2.7 | 1.4 | 1.2 |
| | *12 | — | 10.6 | 2.7 | 5.6 | 4.6 | 0.2 |
| *16 | *11 | — | 4.5 | ← | ← | ← | ← |
| | *12 | — | 4.0 | ← | 4.5 | ← | ← |
| *17 | *18 | mesh | honeycomb | ← | mesh | honeycomb | mesh |
| | *19 | mesh | gauze | ← | gauze | gauze | gauze |
| *20 | | parallel | cross | parallel | cross | parallel | cross |

*1: Material
*2: Weight (g/m2)
*3: Density
*4: Longitudinal (/inch)
*5: Lateral (/inch)
*6: Fiber thickness
*7: Front surface
*8: Rear surface
*9: Pile
*10: Tensile strength (kg/5 cm)
*11: Longitudinal
*12: Lateral
*13: Elongation (%)
*14: Peel strength (kg)
*15: Distortion rate by repeated load
*16: Resistance to wear
*17: Structure of mesh layer
*18: Front
*19: Rear
*20: Pile structure In Table 1, "d" indicates denier. "1 d" indicates a thickness of a thread obtained when the thread of 1 g in amount is elongated by 9,000 m. Thus, for example, "220 d" indicates a thickness of a thread obtained when the thread of 1 g in amount is elongated by 9,000/220=40.9 m. "f" indicates the number of fine filaments or yarns constituting a single thread. Thus, for example, "70 f" indicates that a single thread is constituted by 70 fine filaments. "kg/5 cm" in connection with tensile strength indicates tensile strength of the net-like skin member 6 obtained when the member 6 of 5 cm in width is pulled. "Parallel" in connection with the pile structure indicates that the piles 63 for connecting the front mesh layer 61 and rear mesh layer 62 to each other do not intersect each other as viewed from the side and "cross" indicates that both intersect each other.

The net-like skin member 6, as shown in FIGS. 3 to 8, is formed into a size sufficient to cover a whole surface of the backing cloth member 5, as well as a region of the seat frame 2 extending from the seat back section 3 to the seat cushion section 4. Thus, the net-like skin member 6 is formed into a one-piece structure which is not divided into sections corresponding to the seat back section 3 and seat cushion section 4.

Figure 6:
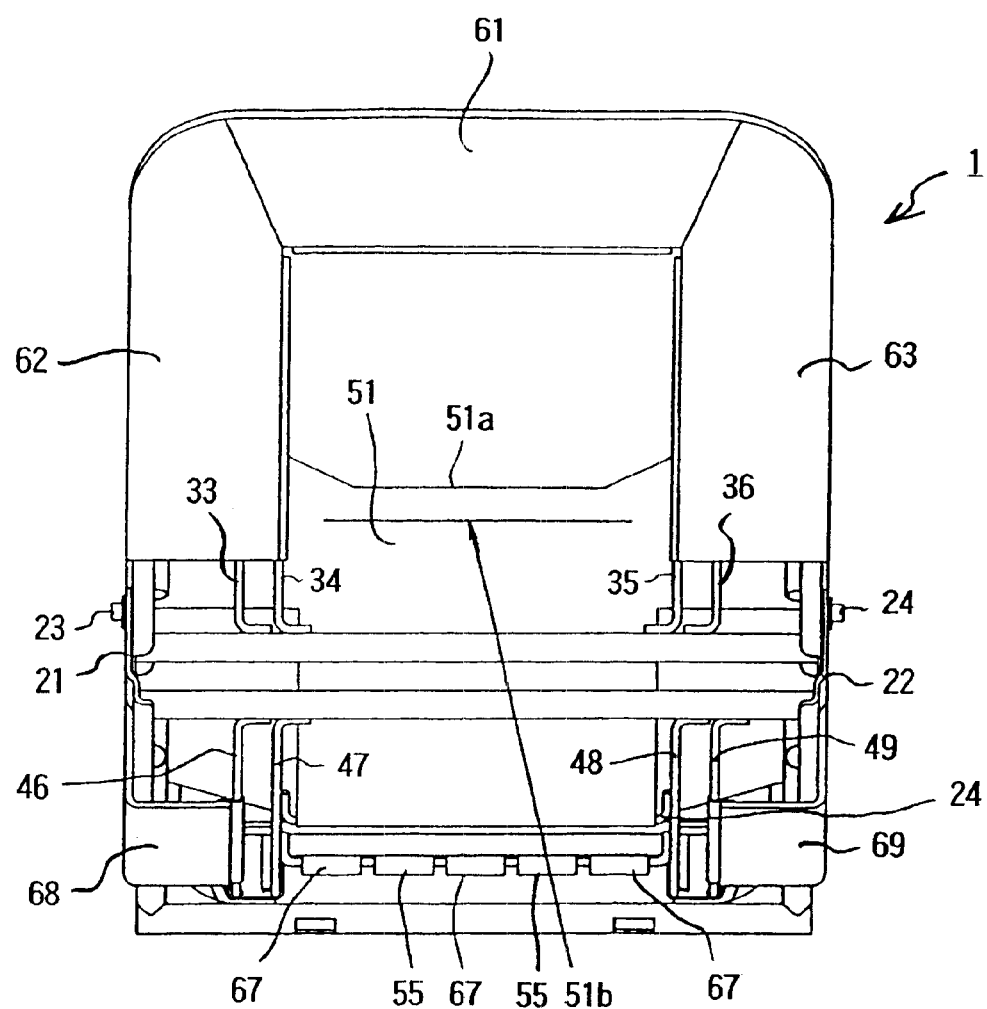
FIG. 6 is a rear elevation view showing an appearance of the seat of FIG. 1.
Figure 7:
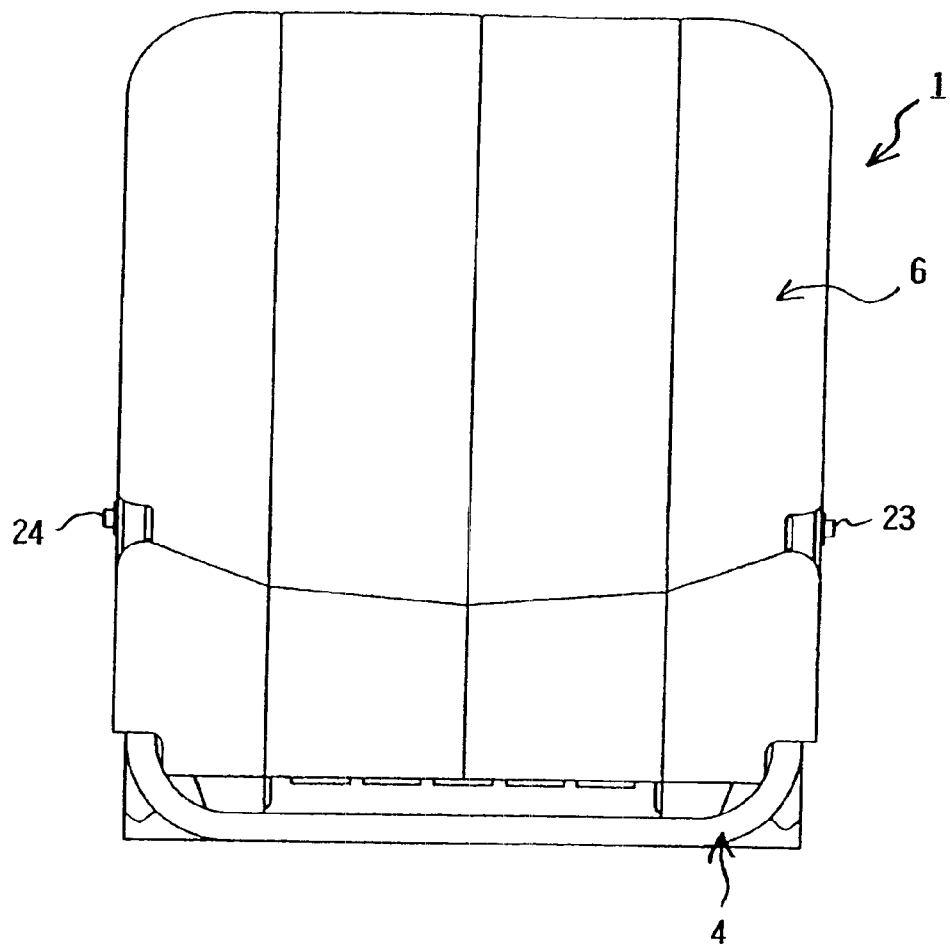
FIG. 7 is a front elevation view showing an appearance of the seat of FIG. 1.
Figure 8:
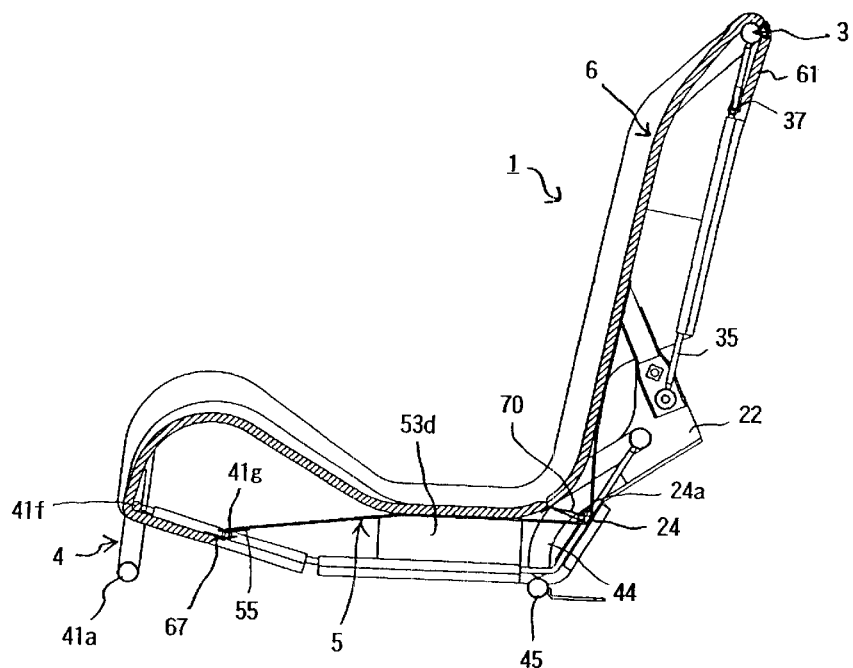
FIG. 8 is a sectional view taken along line A—A of FIG. 3.

More specifically, the net-like skin member 6 is provided at a portion thereof stretched over the first frame member 31 of the seat back section 3 with expansions 61, 62 and 63 projecting or expanding outwardly of the top frame portion 31a and side frame portions 31b and 31c, respectively, as shown in FIG. 6. The expansion 61 expanding outwardly of the top frame portion 31a is held at an edge portion thereof on an upper auxiliary frame member 37 held on an upper portion of the inside auxiliary frame members 34 and 35 behind the seat back section 3, as shown in FIGS. 1 and 8. The expansions 62 and 63 are held at an edge portion thereof on the inside auxiliary frame members 34 and 35, respectively, as shown in FIGS. 6 and 10.

Figure 5:
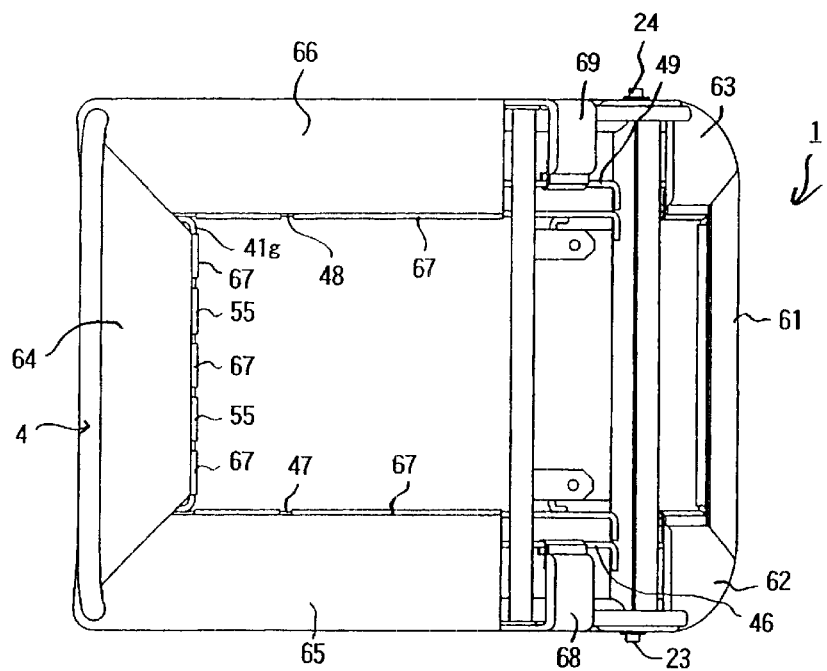
FIG. 5 is a bottom view showing an appearance of the seat of FIG. 1.

Further, the net-like skin member 6 is provided at a portion thereof stretched over the second frame member 41 of the seat cushion section 4 with expansions expanding 64, 65 and 66 outwardly of the front auxiliary frame member 41f and side frame members 41b and 41c, respectively, as shown in FIG. 5. The expansion 64 expanding from the front auxiliary frame member 41f has an edge portion extending downwardly beyond the front auxiliary frame member 41f, so that the edge portion of the expansion 64 is held on a holding frame member 41g. Also, the expansions 65 and 66 are extended downwardly beyond the side frame portions 41b and 41c, to thereby held on the inside auxiliary frame members 47 and 48, as shown in FIGS. 5 and 10.

Holding of the expansions 61 to 66 of the net-like skin member 6 on the upper auxiliary frame member 37, holding frame member 41g, and auxiliary frame members 34, 35, 47 and 48, as shown in FIGS. 9 and 10, is preferably carried out by means of holding elements 67 made of thermoplastic resin and formed into a substantially U-shape in section as in the backing cloth member 5. More particularly, the net-like skin member 6 is put at each of the edge portions thereof on each of the holding elements 67 and then subject to oscillating welding, to thereby be fixed to the holding element 67. Then, the holding elements 67 each are fitted through an open side thereof on each of the frame members. Likewise, the holding frame member 41g, as shown in FIGS. 5 and 6, has an edge portion of the backing cloth member 5 held thereon by means of a holding element 55, so that it is required to reduce a length of each of the holding elements 55 and 67 to hold the backing cloth member 5 and net-like skin member 6 on the holding elements 55 and 67 in a manner to be adjacent to each other.

In order to ensure fixing of an intermediate region of the net-like skin member 6, it is preferable that projection elements 68 and 69 are arranged so as to project from both sides of the seat frame in proximity to an intermediate region thereof and then the net-like skin member 6 is held at an edge portion thereof on any required auxiliary frames such as, for example, the outside auxiliary frames 46 and 49 by means of the holding elements 67. Also, the net-like skin member 6 is so arranged that a region thereof near a central portion thereof conforms to a configuration of the backing cloth member 5 stretched, thus, it is preferable that a hanging wire 24a is arranged in vicinity to the intermediate auxiliary frame member 24 for supporting the intermediate section 52 and a hanging element 70 arranged so as to project on a rear side thereof near a central portion of the net-like skin member 6 is held on the hanging wire 24a, as shown in FIG. 8.

In the illustrated embodiment, the net-like skin member 6 is constructed into a one-piece structure and so arranged that a central region thereof which exhibits maximum cushion characteristics is arranged at a position corresponding to the hip to waist of a person on the seat. Such arrangement permits the net-like skin member 6 to effectively exhibit satisfactory cushion characteristics. Also, the backing cloth member 5 likewise constructed into a one-piece structure is arranged on a region of the seat at which a backing or bearing pressure of a person on the seat is increased, so that cushion characteristics of the backing cloth member 5 and those of the net-like skin member 6 cooperate together to provide a serial spring structure. This reduces a resonance frequency, leading to an improvement in vibration absorbing characteristics of the seat.

Further, in the illustrated embodiment, the net-like skin member 6 is constituted of the front mesh layer 61, the rear mesh layer 61 and the piles 63 made of a single thick thread and arranged therebetween and constructed into the truss structure. Such construction permits the seat to exhibit both increased moisture permeability and air permeability. Also, it provides an elastic structure which substantially prevents setting of the seat, resulting in pressure dispersion, pressure absorption and fitting being improved. In addition, the piles 63 exhibit an elastic function, so that a variation in material for the piles, thickness of a thread therefor, a structure thereof and mechanical characteristics thereof facilitates controlling of hardness of the net-like skin member 6, elasticity thereof and fitting thereof.

The seat of the present invention may be effectively directed to various applications such as a seat for an automobile, a furniture desk such as a study desk or an office desk, a seat for a theater, and the like.

As can be seen form the foregoing, the seat of the present invention is so constructed that the backing cloth member of a one-piece structure is stretched from the seat back section of the seat frame to the seat cushion section thereof and the net-like skin member of a one-piece structure is layered on the backing cloth member wherein the net-like skin member is formed of the front mesh layer, rear mesh layer, piles arranged between both layers into a one-piece structure. This permits the central region of the net-like skin member which exhibits maximum cushion characteristics to be arranged at a position corresponding to the hip to waist of a person on the seat, to thereby eliminate a hard feeling of the frame member positioned at an interface between the seat back section and seat cushion section, resulting in seating characteristics of the seat being highly improved.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A seat comprising:
   a seat frame including a seat back section and a seat cushion section;
   a backing cloth member constructed into a one-piece structure and strechedly arranged from said sat back section to said seat cushion section; and
   a net skin member of a one-piece structure including a front mesh layer, a rear mesh member and a number of piles arranged between said front mesh layer and said rear mesh layer to connect said front and rear mesh layers to each other therethrough and layered on a front surface of said backing cloth member so as to extend from said seat back section to said seat cushion section;
   wherein said backing cloth member includes a laterally extending slit therein, said slit being arranged at a position corresponding to said seat back section of said seat frame.

2. A seat as defined in claim 1, wherein said backing cloth member is so constructed that a height thereof positionally corresponding to a central region of said seat back section defined in a width direction thereof is set so as to positionally correspond to the thoracic vertebrae of a person on said seat.

3. A seat as defined in claim 1, wherein said piles are formed by knitting a single thread between said front mesh layer and said rear mesh layer.

* * * * *